US011074121B2

(12) United States Patent
Breuer et al.

(10) Patent No.: US 11,074,121 B2
(45) Date of Patent: Jul. 27, 2021

(54) PREDICTING FAILURE OF A MAGNETIC TAPE HEAD ELEMENT

(71) Applicant: INTERNATIONAL BUSINESS MACHINES CORPORATION, Armonk, NY (US)

(72) Inventors: Marcus Breuer, Dalheim (DE); Frank Krick, Ockenheim (DE); Tim Oswald, Gimbsheim (DE); Bernd Freitag, Partenheim (DE)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 16/358,973

(22) Filed: Mar. 20, 2019

(65) Prior Publication Data
US 2020/0301774 A1 Sep. 24, 2020

(51) Int. Cl.
*G06F 11/07* (2006.01)
*G11B 5/55* (2006.01)

(52) U.S. Cl.
CPC ...... *G06F 11/0793* (2013.01); *G06F 11/0727* (2013.01); *G06F 11/0751* (2013.01); *G11B 5/5534* (2013.01)

(58) Field of Classification Search
CPC ............ G06F 11/0793; G06F 11/0727; G06F 11/0751; G11B 5/5534
USPC ........................................................ 714/47.3
See application file for complete search history.

(56) References Cited

U.S. PATENT DOCUMENTS

| 4,651,105 A * | 3/1987 | Inbar ................. G11B 20/1816 327/58 |
| 4,891,719 A * | 1/1990 | Andersen ......... G11B 20/10009 360/65 |
| 6,144,518 A | 11/2000 | Magnusson |
| 7,277,246 B2 | 10/2007 | Barbian |

(Continued)

FOREIGN PATENT DOCUMENTS

| EP | 0630001 A2 | 12/1994 |
| EP | 0335507 B1 | 11/1995 |
| EP | 1498901 A1 | 1/2005 |

OTHER PUBLICATIONS

Navigator System, "HP Tape Storage", Annual Maintenance Contract, Rental, IT Infrastructure Management, Aug. 23, 2018, 7 pages, https://navigatorsystem.com/hp-tape-librabry-storage/.

*Primary Examiner* — Yair Leibovich
(74) *Attorney, Agent, or Firm* — Ewa M. Wozniak

(57) ABSTRACT

A method, computer system, and computer program product for determining head wear of magnetic tape head elements of tape drives during operation. The method may include receiving a first calibration parameter for a first tape head element at a first time. Calibration parameter for the first tape head element may be compared with a reference parameter. Determination may be made whether to remove the first tape head element from service or generate a warning, based on a result of the comparison. Method may include generating the first calibration parameter by calculating midpoint bias voltage for the first tape head element as a function of bias current and head resistance. The first calibration parameter for the first tape head element may be bias current parameter or bias resistance parameter. The first calibration parameter for the first tape head element may be less than, equal to, or greater than the reference parameter.

14 Claims, 8 Drawing Sheets

(56) References Cited

U.S. PATENT DOCUMENTS

| | | |
|---|---|---|
| 7,676,445 B2 | 3/2010 | Fry et al. |
| 7,742,252 B2 | 6/2010 | Biskeborn et al. |
| 7,809,990 B2 | 10/2010 | Sasaki |
| 8,355,219 B2 | 1/2013 | Saliba |
| 8,406,096 B1 | 3/2013 | Edling et al. |
| 8,526,134 B2 | 9/2013 | Bui et al. |
| 8,687,314 B2 | 4/2014 | Bui et al. |
| 9,658,784 B1 | 5/2017 | Ahmad et al. |
| 2005/0052772 A1 | 3/2005 | Barbian |
| 2005/0195527 A1* | 9/2005 | Yamaguchi .......... H05K 3/3442 360/234.5 |
| 2010/0157766 A1 | 6/2010 | Gregg et al. |

\* cited by examiner

PREDICTING FAILURE OF A MAGNETIC TAPE HEAD ELEMENT

FIELD

Embodiments of the present invention relate generally to a method, computer system and computer program for determining the head wear of magnetic tape head elements of tape drives during operation.

BACKGROUND

Tape drives may be used for storing digital data that may be readable by computers. Data may be read or written on a tape medium. The tape medium may be elongated and may be defined in a longitudinal direction (along the length of the tape medium), a horizontal direction (thickness of the tape medium), and a transverse direction (direction across the width of the tape medium). When performing data access operations, the tape medium may be actuated to move in the longitudinal direction with respect to a magnetic head of the tape drive.

BRIEF SUMMARY

An embodiment of the present invention may include a method, computer system, and computer program product for determining the head wear of magnetic tape head elements of tape drives during operation.

A computer-implemented method for evaluating a tape head element may include the following operations: receiving a first calibration parameter for a first tape head element at a first time. The calibration parameter for the first tape head element may be compared with a reference parameter. A determination may be made as to whether to remove the first tape head element from service based on a result of the comparison. The method may also include determining whether to generate a warning regarding the first tape head element based on the result of the comparison. The method may include generating the first calibration parameter by calculating a midpoint bias voltage for the first tape head element as a function of a bias current and a head resistance. The first calibration parameter for the first tape head element may be less than or equal to the reference parameter and the calibration parameter for the first tape head element may be a bias current parameter. The first calibration parameter for the first tape head element may be greater than or equal to the reference parameter and the first calibration parameter for the first tape head element may be a bias resistance parameter.

A computer-implemented method for evaluating a tape head element may include receiving a calibration parameter for a first tape head element and a first tape cartridge at a first time. The method may include receiving a first trend for the first tape head element. The first trend may be determined from two or more calibration parameters for the first tape head element determined at respective times prior to the first time. A determination of a second trend from the received calibration parameter for the first tape head element and the first tape cartridge may be made. The two or more calibration parameters for the first tape head element may be determined at respective times prior to the first time. A determination may be made whether the second trend differs from the first trend by more than a first trend change parameter. In response to the determination that the second trend differs from the first trend by more than the trend change parameter, a determination may be made whether a second trend change parameter for a second tape head element is stored in a memory. The second trend change parameter may be determined from a plurality of calibration parameters for the second tape head element, where at least one of the plurality of calibration parameters is for the second tape head element and the first tape cartridge. In response to the determination that a second trend change parameter for a second tape head element is stored in a memory, the method may include a step of generating a warning regarding the first tape cartridge.

The computer-implemented method may also include determining whether a third trend change parameter for a third tape head element is stored in a memory. The third trend change parameter may be determined from a plurality of calibration parameters for the third tape head element. At least one of the plurality of calibration parameters may be for the third tape head element and the first tape cartridge. In response to determining that a third trend change parameter for a third tape head element is stored in a memory, the computer-implemented method may include the step of preventing the first tape cartridge from use.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
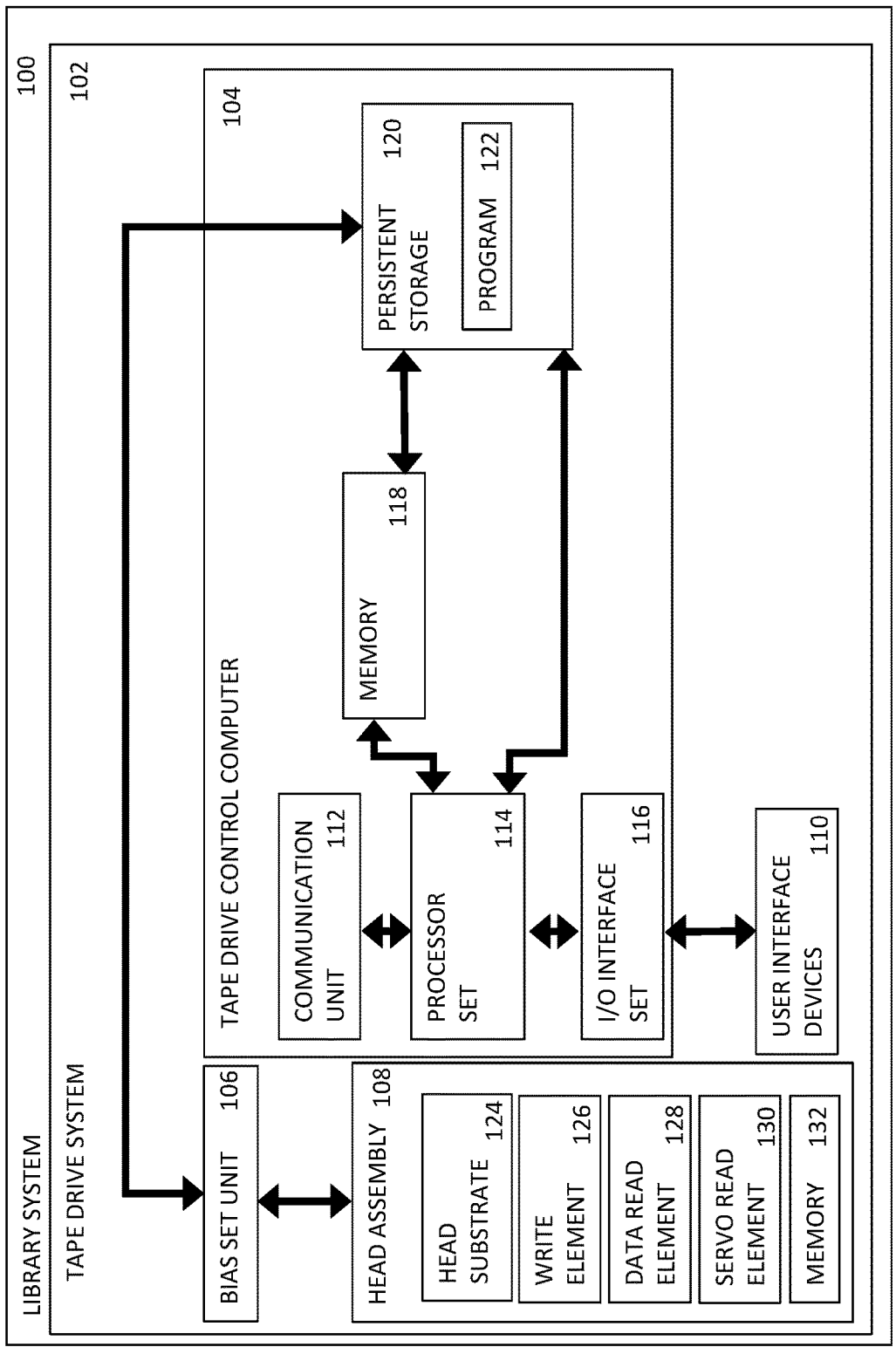
FIG. 1 is a schematic block diagram illustrating one embodiment of a tape library system, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, a computer program product, and a computer system for determining the head wear of magnetic heads of tape drives during operation. This may solve a problem of inaccurate storage and retrieval of data stored on magnetic tape media due to a worn tape head. In addition, embodiments of the present invention provide a method, a computer program product, and a computer system for determining wear of magnetic tape. This may solve a problem of inaccurate storage and retrieval of data stored on magnetic tape media due to worn tape.

Tape drives may be used to store digital data that may be read and executed by a computer. During the actuation of a tape medium, the tape medium may move in a longitudinal direction past the tape head. The relative longitudinal direction motion between the tape medium and the head may cause wear on the head. Tape drives employ heads having write and read transducing elements to record and read data on their respective magnetic physical media. A tape drive may usually consist of multiple write and read transducers laid out perpendicular to the tape media to access multiple tracks at one time.

A tape drive may also include a servomechanism, which is an automatic device that may use error-sensing negative feedback to correct the action of the tape drive. A servomechanism in a tape drive may include several components, such as mechanical parts, transducers, and signal-processing units implemented by logical circuits. For example, in a track-follow servomechanism for some currently conventional tape drives, a coarse actuator and a fine actuator may be used for the transverse positioning of a rigid tape head module relative to the tape medium. A typical rigid tape head module may include data write and read elements, and servomechanism read elements, also known as servo elements. The rigid tape head may also include a skew actuator, which may tilt the tape head module to be angularly aligned during access operations. Access operations may include write/read or read/write operations.

One or more servo elements that are part of the tape head module may provide servo signals to respective servo channels for computing estimates of tape velocity, longitudinal tape position, and a lateral tape head position, also known as transverse position, with respect to the tape. A controller may determine digital control signals for actuators such as an actuator for moving the tape head module, as a whole, in the transverse direction.

Historically, writing to a tape media was done by the application of an electrical current to a coil of a write head. The application of the electric current to a coil of the write head produced a magnetic field which generated a magnetic flux pattern on the magnetic tape media. Reading from a tape media was done by generating an electrical current in the read head of the tape head module. However, due to the demand for higher areal density, technology changed from the described coil technology to a magneto resistance (MR) and further to giant magneto resistance (GMR) technology.

Unlike the induced currents of an inductive head, MR heads work via the MR effect, where MR material changes electrical resistance in the presence of a magnetic field and detects transitions in the magnetic field representative of recorded data. Embodiments of the present invention relate to tape heads that use the MR technology, where the MR material may change its resistance when a magnetic field is applied. However, embodiments are not limited to MR elements. For example, some embodiments may be used with conventional transducing elements. The transition of the electrical resistance may be sensed and may represent previously written data. The MR read head may include a sensing layer formed out of the MR material. A bias voltage may be applied to the sensing layer and changes of the voltage across the sensor may be measured. The changes of the voltage across the sensor may be caused by a change in the electrical resistance.

The head substrate bias voltage may be set to a preset voltage value. Historically, this bias voltage was determined pre-assembly and was not adjusted after the drive was assembled, despite of the natural degradation in the head elements. However, as disclosed in U.S. Pat. No. 7,742,252, which is incorporated herein in its entirety by this reference, the bias voltage may now be controlled and adjusted dynamically after assembly to account for wear degradation in the head elements.

According to the technique disclosed in U.S. Pat. No. 7,742,252 for adjusting head substrate bias voltage after assembly, the substrate bias voltage across a multi head module may be calculated by determining a midpoint voltage of a single read element and using a weighting factor. A recalibration process may be used to compensate for normal head degradation as a function of the wear or other variations implied to a sensing layer. The substrate bias voltage may also be calculated by determining a midpoint voltage of a single write element.

Even though the bias voltage may be controlled and adjusted dynamically, the technique disclosed in U.S. Pat. No. 7,742,252 does not disclose that the calculated change in the bias voltage is retained and stored as data. Rather, the bias voltage is used one time and discarded. Therefore, each time a new cartridge is mounted and used, the bias voltage is calculated and adjusted.

Currently, conventional tape libraries may include multiple tape drives installed and assigned to the hosts. The normal wear of a MR tape head in a tape drive may depend on many factors, such as tape media quality, stored file size, use case of the tape storage, and environmental factors. As a result, it may be difficult to accurately predict the amount of wear on the tape head at any given time, with the result that the tape head may stop working at any time causing problems, such as slowing down or even stopping the writing or reading of data.

Typically, problems with tape drives may be investigated only after a read/write error is detected and user support is involved. This may pose a problem since the cause of the read/write error may not be apparent. Further, during an error investigation, there may not be any data available which may immediately allow a user to determine whether the error detected may be a result of the wear of a tape head, the quality of the tape medium, or another unidentified issue. Even in situations where data is available, the data may have to be analyzed by user support before a determination as to the cause of the problem is made. Typically, user support may rely on its expertise to determine the cause of the error. This investigation may take time which in turn may cause the tape drive to be out of service for an extended period of time. Accordingly, at least some of the embodiments of the present invention, described herein, provide a technical solution to the problem of inaccurate storage and retrieval of data stored on magnetic tape due to a worn tape head or due to a worn tape.

The problem of inaccurate storage and retrieval of data stored on magnetic tape due to a worn tape head is solved by comparing a calibration parameter for a tape head with a reference parameter so that a tape head nearing the end of its useful life can be taken out of service before it starts creating errors. The problem of inaccurate storage and retrieval of data stored on magnetic tape due to worn tape is solved by comparing a calibration trend parameter for a first tape head with a trend parameter for a second tape head element so that a tape that is causing errors can be identified and its use discontinued.

Reference will now be made in detail to the embodiments of the present invention, examples of which are illustrated in the accompanying drawings, wherein like reference numerals refer to like elements throughout.

FIG. 1 illustrates a library system 100 for determining the wear of magnetic tape head elements and the magnetic tape during operation, in accordance with an embodiment of the present invention. In an example embodiment, the library system 100 may include a tape drive system 102. The tape drive system 102 may include a tape drive control computer 104, a bias set unit 106, a head assembly 108, and a user interface device 110. The user interface device 110 may be a display screen but is not limited to such. Other examples of a user interface device 110 may include a printer, a computer mouse, a keyboard, peripheral devices, such as mobile terminal, for example a smartphone, a user's laptop computer, tablet, desktop computer, or a peripheral device such as a smart watch or other wearable device, or any programmable electronic device supporting the functionality required by one or more embodiments of the invention.

The tape drive control computer 104 may include a communication unit 112 which may allow the tape drive system 102 to communicate with the library system 100 or other tape drives via a network. The network (not shown in FIG. 1) may be the Internet, representing a world-wide collection of networks and gateways to support communications between devices connected to the Internet. The network may include, for example, wired, wireless, or fiber optic connections. In alternative embodiments, the network may be implemented as an intranet, a local area network (LAN), or a wide area network (WAN). In general, the network can be any combination of connections and protocols that will support communications between the tape drive system 102 and tape drives.

The tape drive control computer 104 may include a processor set 114, an input/output interface set 116, memory 118, and persistent storage 120. The processor set 114 may be a single chip central processing unit. The input/output interface set 116 may be used for communicating with user interface devices 110. In an embodiment, the memory 118 may be used to store historical data pertaining to substrate bias voltage. In other embodiments, the persistent storage 120, memory 132, or another memory may be used to store historical substrate bias voltages. The persistent storage 120 may include program 122. In an embodiment, the program 122 may be a firmware program. In other embodiments, the program 122 may be any type of software. Program 122 is described herein in more detail with reference to FIG. 2.

The head assembly 108 may include a head substrate 124 upon which a plurality of tape head elements may be fabricated, e.g., one or more write elements 126, one or more data read elements 128, and one or more servo read elements 130. The head substrate 124 may be made of hard materials which may have minimum wear when rubbed by tape. Some examples of the head substrate 124 material may include, but are not limited to, a hard ferrite or HIPed Alumina and Titanium Carbide. The write elements 126 may be used to write data on a tape medium and the data read elements 128 may be used to read data from the tape medium. The servo read elements 130 may be used to read the servo information from the tape. The head assembly 108 may also include a memory 132. The memory 132 may store data relating to the substrate bias voltage of that particular head assembly 108.

Although FIG. 1 shows the library system 100 with one tape drive system 102, principles of an embodiment of the present invention are not restricted to one tape drive system 102 and may be used with any number of tape drive systems 102.

Figure 2:
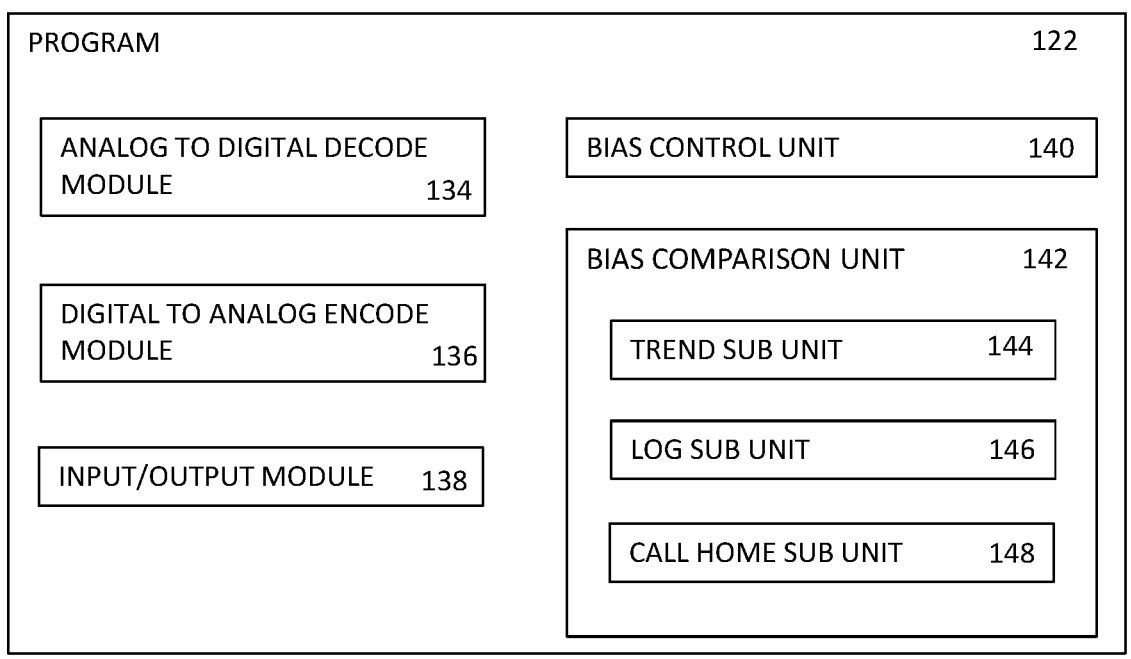
FIG. 2 is a schematic block diagram illustrating one embodiment of a tape drive control program of the library system, in accordance with another embodiment of the invention.

FIG. 2 illustrates a schematic block diagram of one embodiment of the program 122. In an example embodiment of the present invention, program 122 may be a firmware program and may include three modules: analog-to-digital decode module 134, a digital-to-analog encode module 136, and an input/output module 138. The analog-to-digital decode module 134 may convert an analog signal into a digital signal. The analog-to-digital decode module 134 may also convert an input analog voltage or current to a digital number which may represent a magnitude of the voltage or current. The digital-to-analog encode module 136 may perform a reverse function of the analog-to-digital encode module 134 and may convert a digital signal into an analog signal. The input/output module 138 may be used to control communication between the program 122 and the user interface devices 110 (shown in FIG. 1).

The program 122 may also include a bias control unit 140 and a bias comparison unit 142. The bias control unit 140 may control the bias voltage that may be applied to the head substrate 124. The bias comparison unit 142 may include a trend sub unit 144, a log sub unit 146, and a call home sub unit 148. The trend sub unit 144 may be used to calculate a trend in the determined bias voltages, whereas the log sub unit 146 may be used to log bias voltage data and trends in memory 118 of the tape drive control computer 104. The log sub unit 146 may also log bias voltage data and trends in memory 132 of the head assembly 108. The call home sub unit 150 may be used to generate a call home notification. The call home notification may be used to inform a user that a potential issue with the tape head may have arisen.

Figure 3:
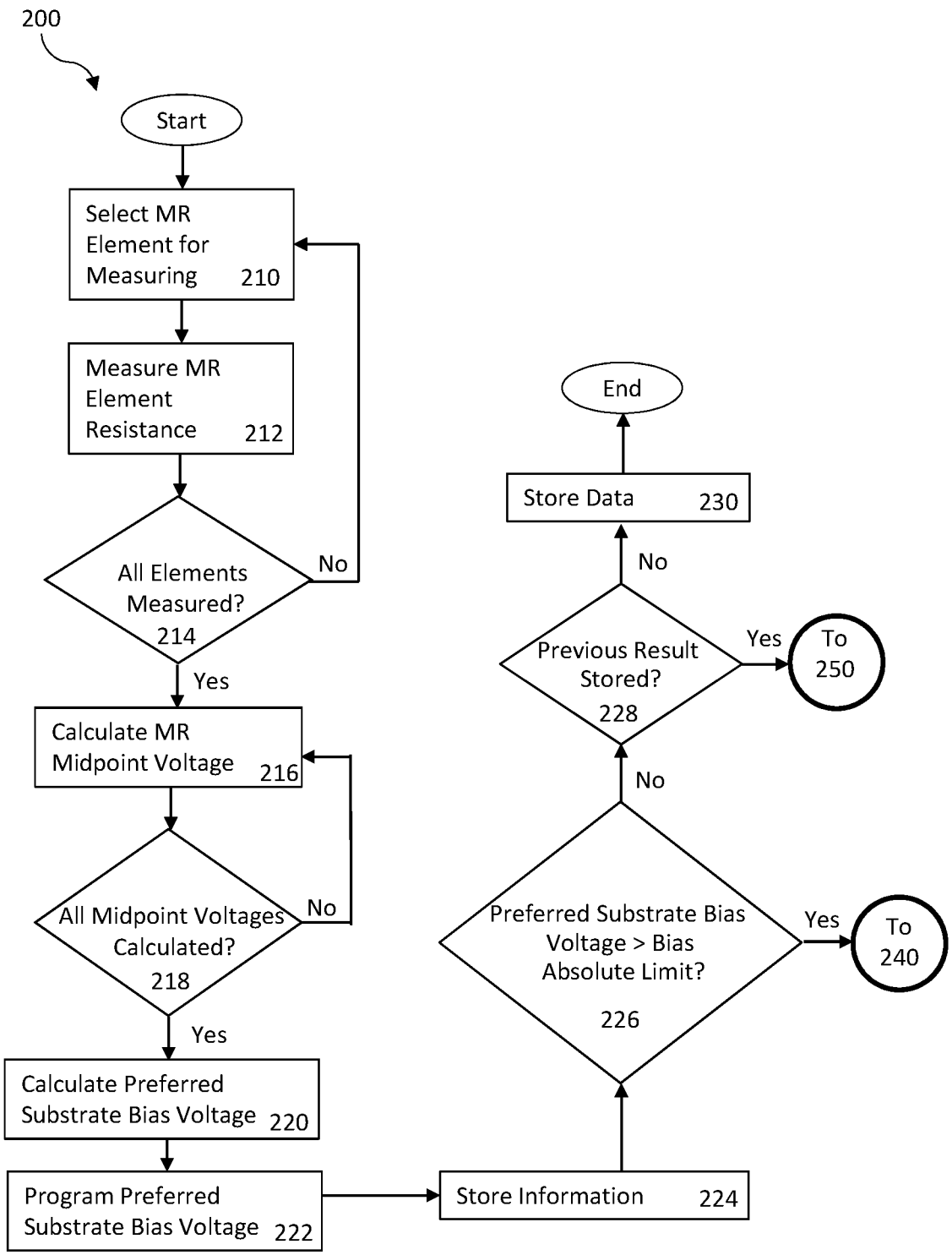
FIG. 3 is a flow chart illustrating an example method for determining the head wear of magnetic recording heads of tape drives during operation, in accordance with another embodiment of the invention.

FIG. 3 illustrates a method 200 for determining the head wear of magnetic recording heads of tape drives during operation, in accordance with an embodiment of the invention. Method 200 describes the calibration process of a cartridge and storage of the calibration data in a memory. The calibration process may include calculating a preferred substrate bias voltage periodically, e.g., each time a cartridge is mounted on a tape drive.

Referring to operation 210, the tape drive system 102 selects a magneto-resistive (MR) element for measuring. The selected element may be the data write element 126, the data read element 128, or the servo read element 130. Referring to operation 212, the resistance of the selected element is measured.

Referring to operation 214, the tape drive system 102 determines whether the resistance of each of a plurality of elements associated with the head assembly 108 has been measured. If the resistance of each element has not been measured, the tape drive system 102 goes back to operation 210 and repeats the operations of selecting, at operation 210, and measuring, at operation 212, the remaining elements.

Once the resistance of each of a plurality of write elements 126, data read elements 128, and servo read elements 130 have been measured, the tape drive system 102, at operation 216, calculates the MR midpoint voltage for each write element 126, data read element 128, and servo read element 130. Referring to operation 218, if all midpoint voltages have not been calculated, the tape drive system 102 goes back to operation 216 to calculate the MR midpoint voltages of the remaining elements. When all midpoint voltages have been calculated, the tape drive system 102 proceeds to operation 220 and calculates a preferred substrate bias voltage.

At operation 220, the sum total of write elements 126, data read elements 128, and servo read elements 130 is determined. In an embodiment of the invention, operation 220 may be determined by the tape drive system 102. In an alternative embodiment of the invention, operation 220 may be determined by the head assembly 108. From among the total of write elements 126, data read elements 128, and servo read elements 130 associated with head assembly 108, a number of write elements 126, data read elements 128, and servo read elements 130 is selected. In an example embodiment, all the write elements 126, data read elements 128, and servo read elements 130 may be selected. Alternatively, an exclusive number of write elements 126, data read elements 128, and servo read elements 130 may be selected. The tape drive system 102 stores a value for a weighting factor. The weighting factor may give preference to write elements 126, data read elements 128, and servo read elements 130 in calculating the preferred substrate bias voltage.

Once the midpoint voltages for each element, the total number of elements, the selected number of write elements 126, data read elements 128, and servo read elements 130, and the weighting factor are obtained, all are used to calculate, at operation 222, the preferred substrate bias voltage. The preferred substrate bias voltage is supplied to the substrate via a circuit (not shown in the Figures).

The preferred substrate bias voltage is also stored, at operation 224. The preferred substrate bias voltage may be stored in the memory 118 of the tape drive system 102. Optionally, the preferred substrate bias voltage may be stored in a memory 132 of the head assembly 108 or on a hard drive of the library system 100. Additional information, such as the drive serial number or the cartridge serial number, may also be stored along with the preferred substrate bias voltage, but is not limited to such.

The preferred substrate voltage and the resistance data for the selected elements may be stored in a table such as the one illustrated herein.

| Cartridge Number | Tape Drive Number | Resistance | Voltage | Current |
|---|---|---|---|---|
| 1 | 1 | 85 Ω | 12 V | 140 mA |
| 1 | 2 | 75 Ω | 12 V | 160 mA |

The table may also provide information as to the cartridge number and the tape drive number and the associated resistance, voltage and current for each.

Referring to operation 226, the tape drive system 102 compares the preferred substrate bias voltage to the bias absolute limit. The bias absolute limit may refer to the largest current value that may be applied to the substrate bias in order for the tape drive to work. If the preferred substrate bias voltage exceeds the bias absolute limit, the tape drive system 102 proceeds to operation 240, which is described in more detail with respect to FIG. 4. If the preferred substrate bias voltage does not exceed the bias absolute limit, the tape drive system 102 proceeds to operation 228.

Referring to operation 228, the tape drive system 102 determines whether previous preferred substrate bias voltages have been stored in memory. The previous preferred substrate bias voltage results may be stored in the memory 118 of the tape drive system 102, the memory 132 of the head assembly 108, or the hard drive of the library system 100. If there are previous results stored, the tape drive system 102 proceeds to operation 250, which is described in more detail with respect to FIG. 5. If there is no previous data stored, then the preferred substrate bias voltage is stored in a memory, at operation 230.

Figure 4:
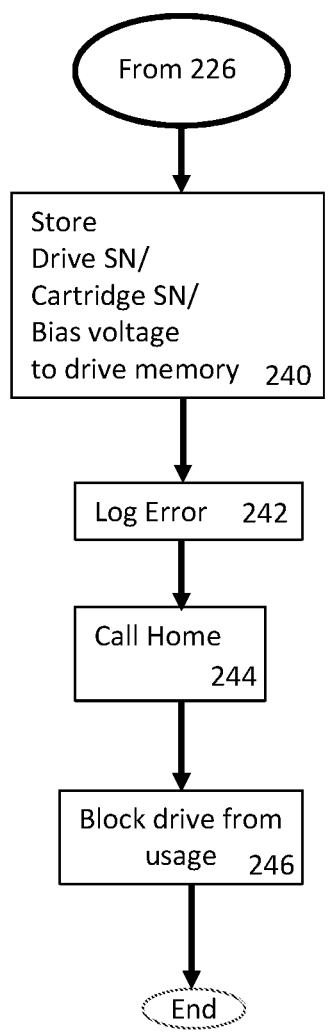
FIG. 4 is a flow chart illustrating an example method for determining the head wear of magnetic recording heads of tape drives during operation, in accordance with an embodiment of the invention.

FIG. 4 is a flow chart illustrating an example method for determining the head wear of magnetic recording heads of tape drives during operation, in accordance with an embodiment of the invention. As described with reference to FIG. 3, the preferred substrate bias voltage is calculated and subsequently compared with the bias absolute limit (operation 226). If the preferred substrate bias voltage exceeds the bias absolute limit, the method 200 proceeds to operation 240.

Referring to operation 240 of FIG. 4, the tape drive system 102 stores information, such as, but not limited to, the drive serial number, the cartridge serial number and the preferred bias voltage in the memory 118. Optionally, the information may also be stored in the memory 132 of the head assembly 108 or in the hard drive of the library system 100.

Referring to operation 242, an error is logged by the log sub unit 146. Once the error is logged, a call home is generated, at operation 244, using the call home sub unit 150 and the drive may be blocked, at operation 246, from further use. In addition or in the alternative, a message indicating the error may be generated.

Figure 5:
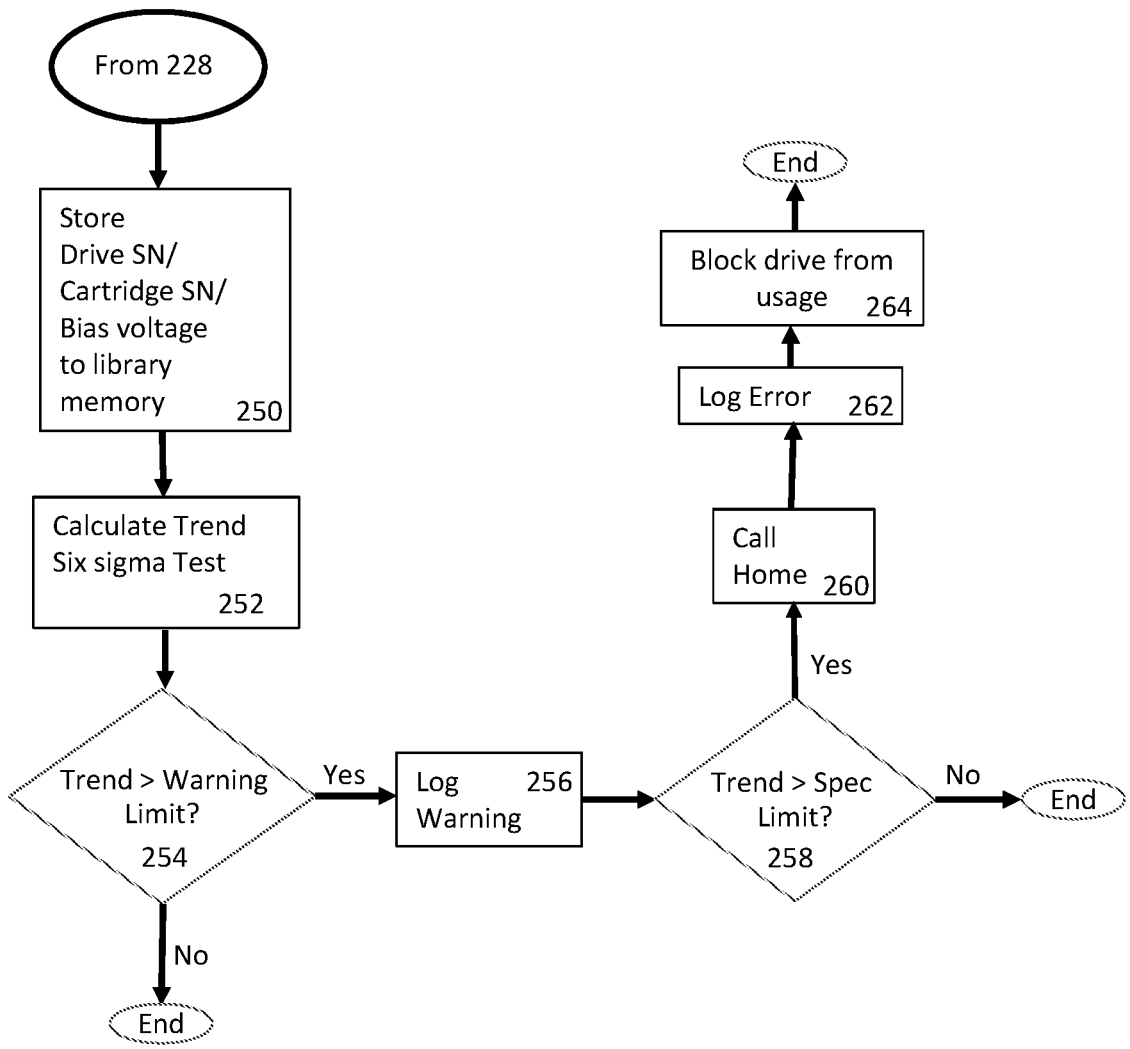
FIG. 5 is a flow chart illustrating an example method for determining the head wear of magnetic recording heads of tape drives during operation, in accordance with another embodiment of the invention.

FIG. 5 is a flow chart illustrating an example method for determining the head wear of magnetic recording heads of tape drives during operation, in accordance with another embodiment of the invention. As described with reference to FIG. 3, at operation 228, the tape drive system 102 determines whether previously calculated, e.g., historical, preferred substrate bias voltages are stored. The previous results may be stored in the memory 118 of the tape drive system 102. Optionally, the information may also be stored in the memory 132 of the head assembly 108 or in the hard drive of the library system 100. If previous results have been stored, the tape drive system 102 proceeds to operation 250 of FIG. 5.

Referring to operation 250, the tape drive system 102 stores information relating to the cartridge and the tape drive. This information may be, but is not limited to, a tape drive serial number, a cartridge serial number, a tape drive code, a cartridge barcode, or a bias voltage. The information may be stored in memory 118. Optionally, the information may also be stored in the memory 132 of the head assembly 108 or in the hard drive of the library system 100.

The tape drive system 102, at operation 252, takes the stored bias voltage values and calculates, using statistical analysis, a trend in the data. The tape drive system 102 may use a six-sigma test to perform the calculations. The tape drive system 102 may also utilize any other test or analysis which may allow for a data trend to be determined, e.g., linear regression.

Once the trend is calculated a trend parameter may be determined, and the tape drive system 102 compares, at operation 254, the calculated trend parameter to a specification warning limit. For example, referring to FIG. 8, a line 4 may be determined from a plurality of calibration (e.g., bias voltage) parameters 2 determined as various times prior to a current time. A slope of the line may be determined and the line may be extrapolated to predict calibration parameters at future times. A trend parameter 6 may be a predicted calibration parameter at a particular future time, e.g., an hour, a day, a week, or a month in the future. If the calculated trend parameter is lower than a first specification warning limit 8, the process ends and the tape drive is continued to be used.

Figure 8:
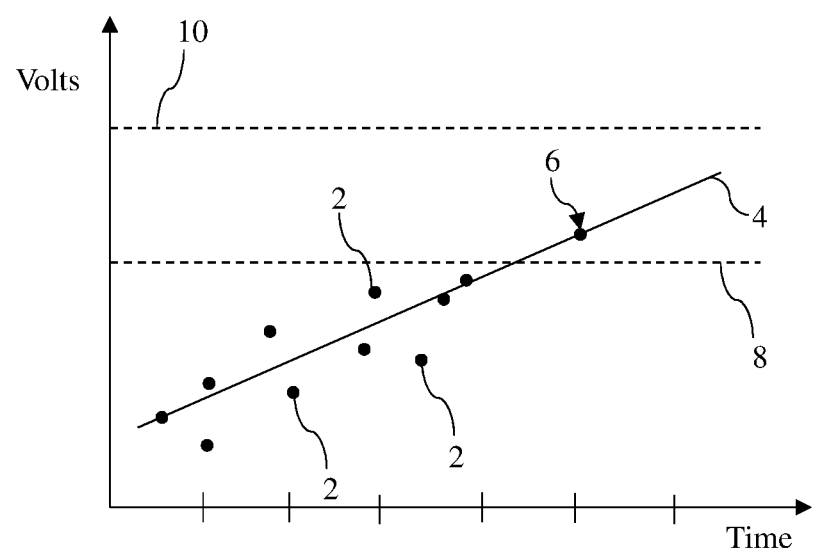
FIG. 8 is a graph illustrating an example linear regression graph, in accordance with an embodiment of the invention.

Referring to operation 256 and FIG. 8, if the trend parameter 6 is higher than then the first specification warning limit 8, but lower that a second specification warning limit 10, a warning is logged by the log sub unit 146 and the trend is further compared, at operation 258, to the second specification limit. The warning limit may be stored in the memory 118, 120, or 132. The second specification limit may be the bias absolute value or any other value that may be associated with the head assembly 108. The second specification limit may correspond with a bad or unreliable tape head. If the trend parameter 6 does not exceed the second specification limit, the tape drive is continued to be used. If the trend parameter 6 exceeds the second specification limit, the tape drive system 102 generates, at operation 260, a call home. The call home is generated by the call home sub unit 148 and stored in memory 118 of the tape drive system 102. Optionally, the call home may also be stored in the memory 132 of the head assembly 108 or in the hard drive of the library system 100. Referring to operation 262, the log sub unit 146 logs an error in the tape drive system 102. Once the error is logged, the drive may be blocked by the tape drive system 102, at operation 264, from further use.

Figure 6:
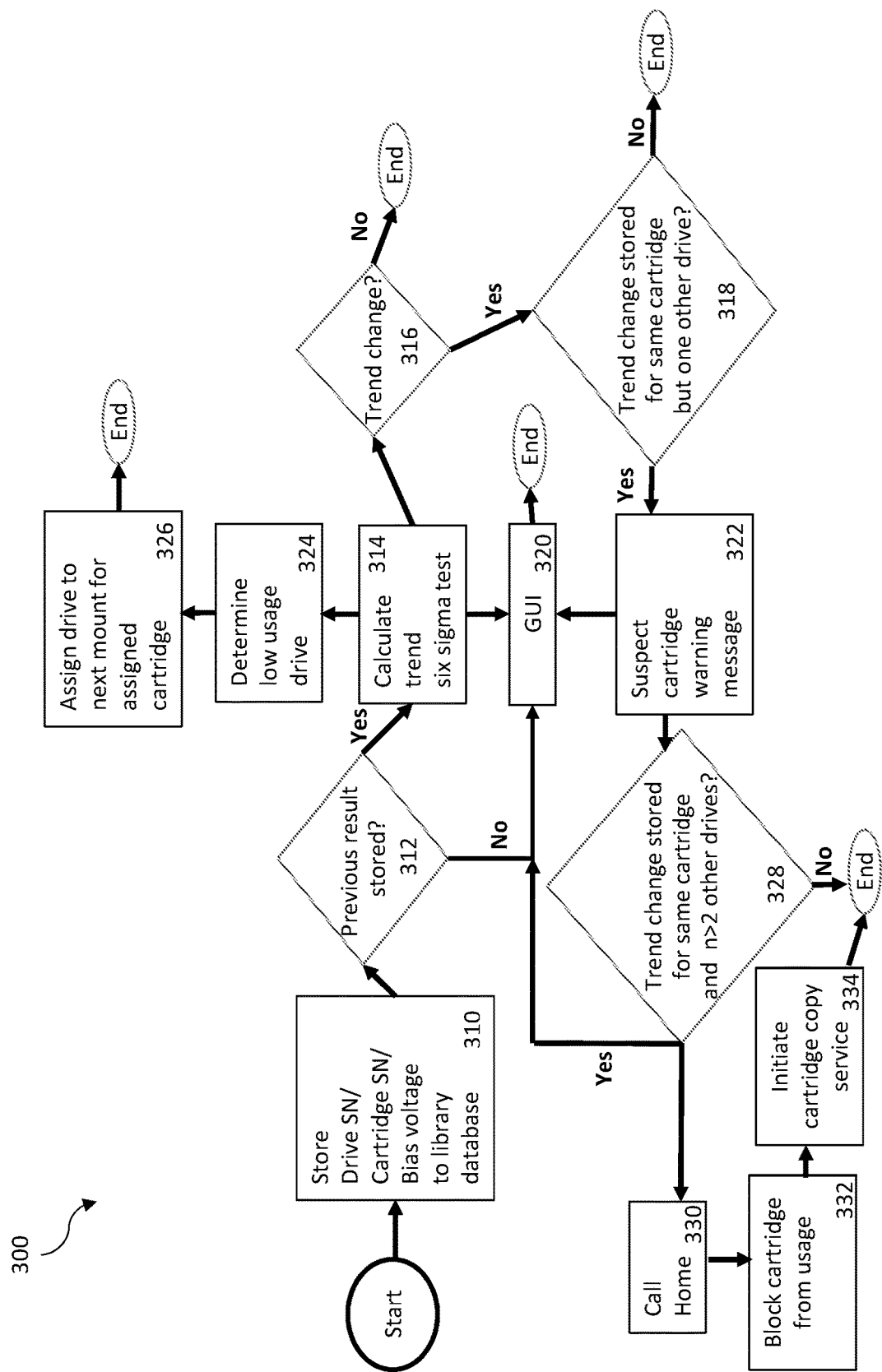
FIG. 6 is a flow chart illustrating an example method for determining the head wear of magnetic recording heads of tape drives during operation, in accordance with another embodiment of the invention.

FIG. 6 illustrates a method 300 for using the library system 100, in accordance with an embodiment of the invention. As described with reference to FIG. 3, a preferred substrate bias voltage is calculated and subsequently stored, at operation 224. The preferred substrate bias voltage may be a calibration parameter.

Referring to operation 310, the library system 100 stores information such as, but not limited to, the drive serial number, the cartridge serial number, and the preferred substrate bias voltage. The library system 100 checks, at operation 312, whether previous calibration parameters, e.g., calculated substrate bias voltages were stored. If previous substrate bias voltages were stored, then the library system 100 calculates, at operation 314, a bias voltage trend parameter using a statistical method. Some examples of statistical methods may include a six sigma test or linear regression. If there are no previous calibration parameters, e.g., substrate bias voltages, available, the library system 100 displays information, at operation 320, on a graphical user interface device (GUI) 110. The GUI device 110 may display information pertaining to the bias voltage value, drive serial number, cartridge serial number, or any other information that may be relevant to determine the potential wear on a particular tape head or tape cartridge.

Referring to operation 316, once the substrate bias voltage trend is calculated, it is analyzed to determine whether there is a trend change in the values. For example, if linear regression is employed to determine a trend, the trend may be a slope of a line determined from the plurality of calibration parameters determined at times prior to a current time. A trend change be a change in the slope of the line. If there is no trend change, then the calculated trend may be stored in the library system 100. If there is a trend change, the library system 100 searches, at operation 318, its database to determine whether historical trend changes for that particular cartridge and other tape heads are available. The historical trend data may correspond to a particular cartridge that was previously used with one or more other drives. If historical trend changes for that particular cartridge when used with a different tape drive head are not available, then the calculated trend is saved in the library system 100. If the historical trend changes are available, the cartridge is flagged, at operation 322, as a potential candidate for media replacement. The flagging of a cartridge as a potential candidate for media replacement is then displayed, at operation 320, on the GUI device 110.

Referring to operation 328, the library system 100 determines how many trend changes for other drives are stored for the same cartridge. In one embodiment, if there are more than two trend changes for two or more other drives found, the call home sub unit 152 generates a call home at operation 330. Once the call home is generated, the library system 100 can block the cartridge, at operation 332, from being used to store additional data. In addition, at operation 334, the library system 100 can initiate a cartridge copy service. The cartridge copy service copies data stored on a cartridge determined to be bad on to a new cartridge that will serve as a replacement for the bad cartridge.

Referring to operation 324, the library system 100 may also look at the number of previously stored results to determine whether a particular tape drive has been seldomly used. If the library system 100 determines that there is a particular tape drive that has not been used often, the drive may be prioritized and may be flagged as the next drive to be used with a cartridge (operation 326). This may allow for the tape drives in the library system 100 to be equally used.

Figure 7:
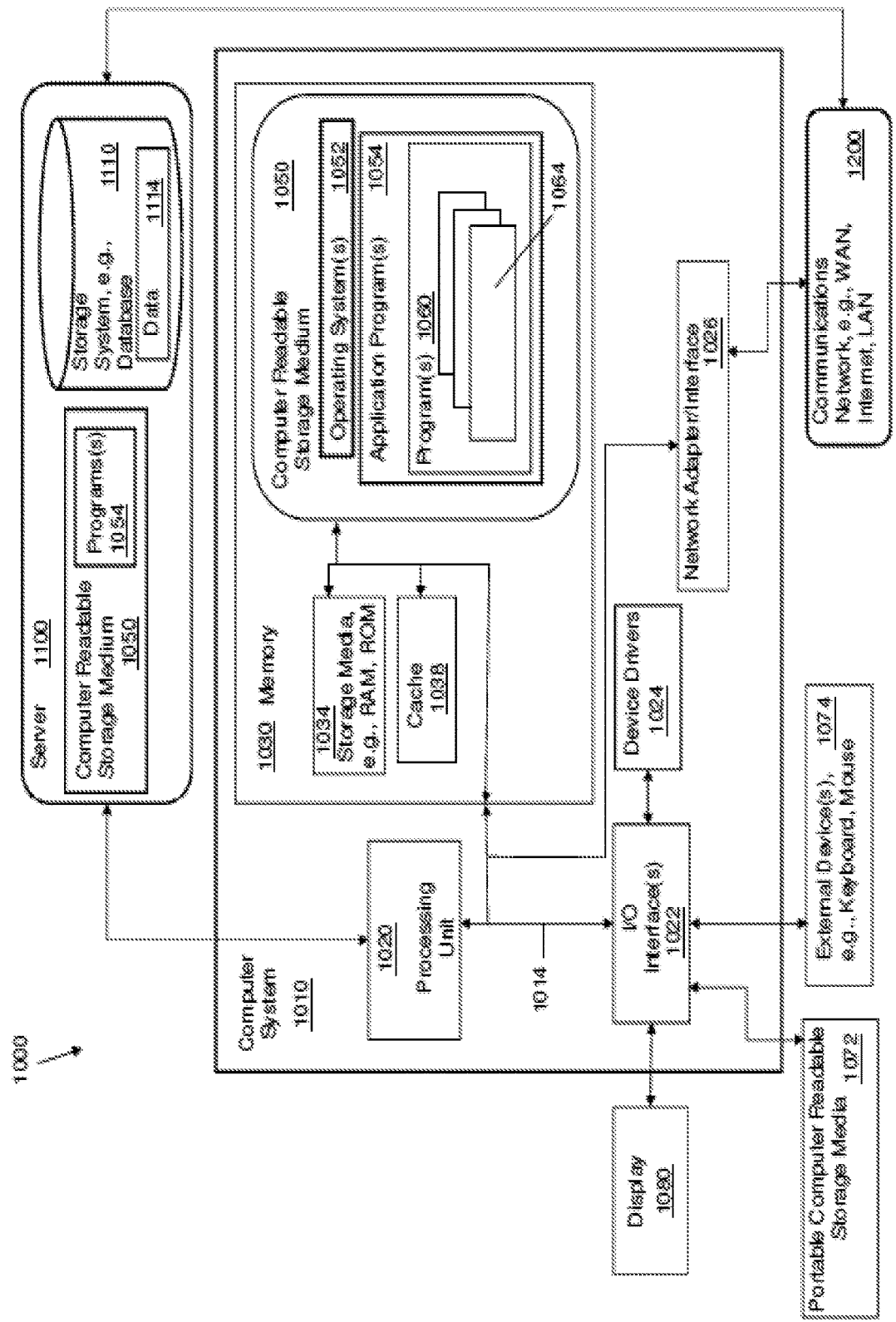
FIG. 7 is a block diagram depicting the hardware components of a system for determining the head wear of magnetic recording heads of tape drives during operation, in accordance with an embodiment of the invention.

Referring to FIG. 7, a system 1000 includes a computer system or computer 1010 shown in the form of a generic computing device. The methods 200 and 300, for example, may be embodied in a program(s) 1060 (FIG. 7) embodied on a computer readable storage device, for example, generally referred to as memory 1030 and more specifically, computer readable storage medium 1050 as shown in FIG. 7. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 7 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 7 as program modules 1064. The program 1060 and program modules 1064 can execute specific steps, routines, sub-routines, instructions or code, of the program.

The methods of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 7, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The methods 200 and 300 (FIGS. 3, 4, 5, and 6), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed system and environments have been sequentially or serially identified suing numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for evaluating tape head elements, comprising:
    initiating a calibration process of a cartridge mounted on a tape drive, the calibration process includes measuring a bias current and a head resistance;
    generating a first calibration parameter by calculating a midpoint bias voltage for a first tape head element as a function of the bias current and the head resistance;
    receiving the first calibration parameter for the first tape head element at a first time;
    comparing the calibration parameter for the first tape head element with a reference parameter; and
    blocking usage of the first tape head element from service based on a result of the comparison.

2. The computer-implemented method of claim 1, further comprising:
    determining whether to generate a warning regarding the first tape head element based on the result of the comparison.

3. The computer-implemented method of claim 2, wherein:
    the result of the comparison is that the first calibration parameter for the first tape head element is less than or equal to the reference parameter; and
    the calibration parameter for the first tape head element is a bias current parameter.

4. The computer-implemented method of claim 2, wherein:
    the result of the comparison is that the first calibration parameter for the first tape head element is greater than or equal to the reference parameter; and
    the first calibration parameter for the first tape head element is a bias resistance parameter.

5. The computer-implemented method of claim 1, wherein the result of the comparison is that the first calibration parameter for the first tape head element is greater than or equal to the reference parameter.

6. The computer-implemented method of claim 1, wherein the first tape head element is included in a head assembly, the head assembly including a plurality of tape head elements, further comprising removing the head assembly.

7. A computer-implemented method for evaluating a tape head element, comprising:
    initiating a calibration process of a cartridge mounted on a tape drive, the calibration process includes measuring a bias current and a head resistance;
    receiving a calibration parameter for a first tape head element and a first tape cartridge at a first time;
    receiving a first trend for the first tape head element, wherein the first trend is determined from two or more calibration parameters for the first tape head element determined at respective times prior to the first time;
    determining a second trend from the received calibration parameter for the first tape head element and the first tape cartridge, and the two or more calibration parameters for the first tape head element determined at respective times prior to the first time;
    determining whether the second trend differs from the first trend by more than a first trend change parameter;
    in response to determining that the second trend differs from the first trend by more than the trend change parameter, determining whether a second trend change parameter for a second tape head element is stored in a memory, the second trend change parameter being determined from a plurality of calibration parameters for the second tape head element, wherein at least one of the plurality of calibration parameters is for the second tape head element and the first tape cartridge;
    in response to determining that the second trend change parameter for the second tape head element is stored in a memory, generating a warning regarding the first tape cartridge.

8. The computer-implemented method of claim 7, further comprising:
    determining whether a third trend change parameter for a third tape head element is stored in a memory, the third trend change parameter being determined from a plurality of calibration parameters for the third tape head element, wherein at least one of the plurality of calibration parameters is for the third tape head element and the first tape cartridge;

in response to determining that the third trend change parameter for the third tape head element is stored in a memory, preventing the first tape cartridge from use.

9. A system for evaluating a tape head element, comprising:

a computer system comprising, a processor, a computer readable storage medium, and program instructions stored on the computer readable storage medium being executable by the processor to cause the computer system to:

initiate a calibration process of a cartridge mounted on a tape drive, the calibration process includes measuring a bias current and a head resistance;

generate a first calibration parameter by calculating a midpoint bias voltage for a first tape head element as a function of the bias current and the head resistance;

receive the first calibration parameter for the first tape head element at a first time;

compare the calibration parameter for the first tape head element with a reference parameter; and block usage of the first tape head element from service based on a result of the comparison.

10. The system of claim 9, further comprising:

determining whether to generate a warning regarding the first tape head element based on the result of the comparison.

11. The system of claim 10, wherein:

the result of the comparison is that the first calibration parameter for the first tape head element is less than or equal to the reference parameter; and the calibration parameter for the first tape head element is a bias current parameter.

12. The system of claim 10, wherein:

the result of the comparison is that the first calibration parameter for the first tape head element is greater than or equal to the reference parameter; and the calibration parameter for the first tape head element is a bias resistance parameter.

13. The system of claim 9, wherein the result of the comparison is that the first calibration parameter for the first tape head element is greater than or equal to the reference parameter.

14. The system of claim 9, wherein the first tape head element is included in a head assembly, the head assembly including a plurality of tape head elements, further comprising removing the head assembly.

* * * * *